INVENTOR
A. Westlinning
By Marks & Clark
Attys.

Patented Jan. 28, 1936

2,029,044

UNITED STATES PATENT OFFICE 2,029,044

PROCESS OF MAKING CABLES

Anton Westlinning, Lautawerk/Lausitz, Germany

Application October 12, 1933, Serial No. 693,389
In Great Britain February 28, 1933

6 Claims. (Cl. 113—33)

This invention relates to a method for sheathing heavy current and light current cables by the longitudinal welding of sheets of aluminium and aluminium alloys and its main object is to prevent transmission of the heat arising during the welding and/or of the forces exerted on the cable during the welding.

When attempts were made to sheath heavy current and light current cables with aluminium instead of lead difficulties arose in as much as the heat necessary for welding the sheathing, or the forces exerted during the welding, were transmitted to the cable with consequent injury to the latter. It has already been proposed to keep the heat arising during the welding away from the cable by providing the latter with a casing made of substances which are poor thermal conductors and which form an intermediate layer between the cable and its sheathing. If such an intermediate layer is to be effective it must be thick enough, since the welding temperature of aluminium is considerably higher than that which the cable, and more particularly the insulating material used in the construction, can withstand without injury. Thick intermediate layers, however, raise the external diameter of the result in sheathed cable in a manner which is disadvantageous both technically and economically.

These and other disadvantages are removed by the present process. In the latter a hollow intermediate element or insertion, hereinafter referred to as a "welding shoe" and described in greater detail below having the shape or curvature of the sheathing of the cable and capable of being cooled, is inserted between the sheathing and the cable for the duration of the welding operation, which latter can be carried out by one of the known processes, e. g. autogenous, hammer, arc or resistance welding.

The cooling, for example, can be effected by sucking air through the hollow shoe which is open at its end, as a result of which an extensive removal of air from the cable sheathing is produced at the same time.

The invention is shown by way of example in the accompanying drawing in which

Figure 3:
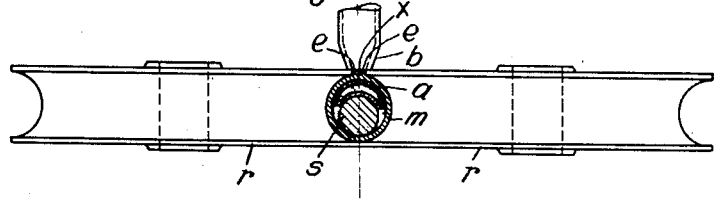
Figure 3 shows a sectional view.
Figure 4:
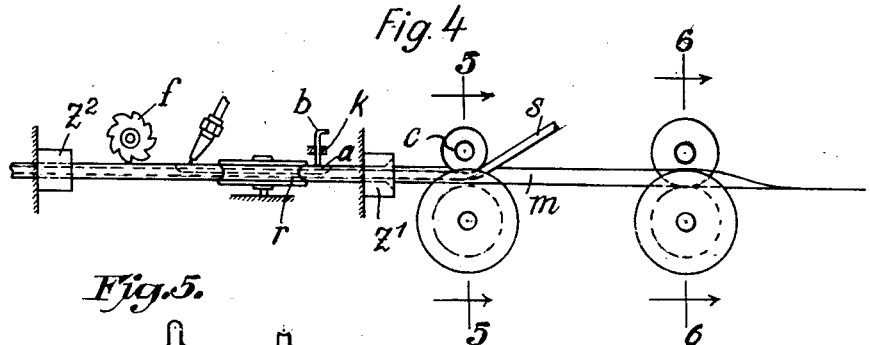
Figure 4 shows a schematic view of the complete plant.
Figures 5, 6:
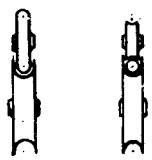
Fig. 5 is a sectional view on line 5—5 of Fig. 4.
Fig. 6 is a sectional view on line 6—6 of Fig. 4.

The aluminium or alloy thereof intended for the sheathing is supplied in the form of a flat sheet $m$ (Figure 4). The sheet is preliminarily bent by the roller B approximately into the shape of a trough, at the same time the longitudinal edges which are later to be welded together being provided with a small flanging at $e$ (Figure 3). The core $s$ of the cable is introduced into this preliminarily bent sheet with the aid of a guiding roller C. The cable now passes through a draw matrix $Z^1$ where the aluminium sheathing is wrapped around the core of the cable so that its longitudinal edges abut. The cable now passes the welding shoe $a$ which forms the subject matter of the invention. This shoe consists of an insertion adapted to the shape of the cable and extending approximately over a half of the outer surface of the cable and is open at the end. A pipe $b$ is attached to it. This hollow insertion is rigidly mounted in any desired manner outside the cable at $k$.

Figure 1:
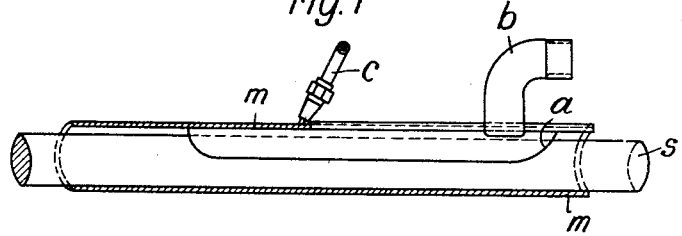
Figure 1 shows a side view of the cable at the point at which the sheathing is to be welded.
Figure 2:
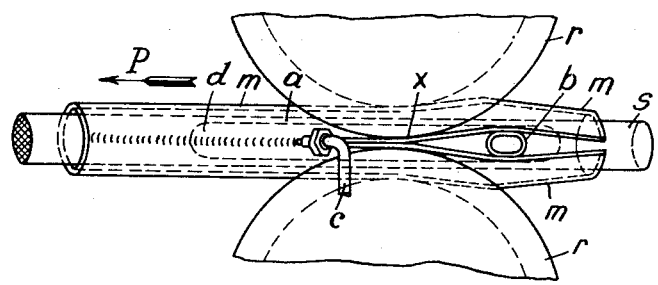
Figure 2 shows a plan view of the arrangements shown in Figure 1 whilst

The cable is advanced by means of suitable drawing means, the core passing underneath the insertion $a$ which embraces it and the longitudinal edge of the sheathing passing along on the pipe $b$ (Figure 2). Air is sucked through the insertion or welding shoe and in this way the welding point is kept cool whilst at the same time air is removed from the interior of the cable. Of course any other suitable cooling means may be used. As soon as the air suction pipe $b$ is passed the pressure rollers $r$ come into action and force the aluminium sheathing $m$ closely together at the point $x$ (Figures 2, 3). As the cable further advances welding is effected by means of the welding burner $c$ at the longitudinal edge where the edges of the sheathing meet whereby a welded seam $d$ is formed. The arrow P indicates the direction in which the cable is drawn.

After the welding has been effected the cable passes, if necessary, a cutting appliance $f$ or the like which smoothes down the welded seam. The cable is then drawn through a second draw matrix $Z^2$ which diminishes the diameter of the sheathing to such an extent that the latter embraces the cable more or less firmly.

An appliance may then be used which provides the outer surface of the cable with grooves in order to increase its flexibility.

The preliminarily shaped cable sheathing is given an internal width which is such that it can accommodate the insertion $a$ in addition to the cable. For this purpose it is sufficient to make the internal width of the sheathing 3 to 5 mm. larger than the diameter of the cable to be sheathed.

The forcing together of the cable sheathing may, if for any reason this should be desirable, also be effected by means other than the pressure rollers $r$, for example by suitably constructed and supported endless tracks or bands, which preferably are made so that they contribute to the leading away of the heat arising in the welding operation.

What I claim is:

1. The process of welding a certain part of aluminium mantles for heavy and light current cables while keeping another part cool consisting in bending a flat sheet of aluminium or its alloys into a trough-like shape, introducing the core into the latter, arranging a shoe between the core and the edges of the bent sheet, cooling the shoe and simultaneously welding the edges of the sheet together while passing the sheet and core longitudinally of the shoe.

2. The process of welding a certain part of aluminium mantles for heavy and light current cables while keeping another part cool consisting in bending a flat sheet of aluminium or its alloys into a trough-like shape, introducing the core into the latter, arranging a hollow shoe longitudinally of the core, wrapping the sides of the trough around the core with the edges thereof positioned above the shoe, introducing a cooling medium into the shoe, and applying a welding element exteriorly of the shoe and over the edges of the sheet to effect welding of the edges together simultaneously with the movement of the core and sheet along the cooling element.

3. The process of welding a certain part of aluminium mantles for heavy and light current cables while keeping another part cool consisting in bending a flat sheet of aluminium or its alloys into a trough-like shape, introducing the core into the latter, arranging a hollow shoe between the core and the bent sheet so that the shoe partly embraces the core beneath the edges of the sheet, introducing a cooling medium into the shoe and passing the sheet and core along the cooling shoe and simultaneously welding the edges of the sheet at a point exteriorly of the shoe.

4. The process of welding a certain part of aluminium mantles for heavy and light current cables while keeping another part cool consisting in bending a flat sheet of aluminium or its alloys into a trough-like shape, introducing the core into the latter, arranging a hollow shoe between the core and the bent sheet, introducing a cooling medium into the shoe, pressing the edges of the mantle closely together and applying a welding element over the meeting edges of the sheet to effect welding of the edges together simultaneously with the movement of the core and sheet along the cooling shoe.

5. The process of welding a certain part of aluminium mantles for heavy and light current cables while keeping another part cool consisting in bending a flat sheet of aluminium or its alloys into a trough-like shape, introducing the core into the latter, arranging a hollow shoe above the core so that the shoe partly embraces the core, introducing a cooling medium into the shoe, pressing the edges of the sheet closely together exteriorly of the shoe, and applying a welding element to the meeting edges of the sheet to effect welding of the same together at a point above the shoe while moving the core and sheet along the cooling shoe.

6. A process of welding a certain part of aluminium mantles for heavy and light current cables while keeping another part cool consisting in bending a flat sheet into a trough-like form, inserting a core thereinto, moving the sheet and core beneath a hollow shoe so that the shoe embraces the upper part of the core, inserting a cooling medium into the shoe, pressing the edges of the sheet about the top of the shoe, and applying a welding element exteriorly of the meeting edges at a point above the shoe.

ANTON WESTLINNING.